April 13, 1954
C. E. FULLER ET AL
2,675,013
BEARING WASHER
Filed Aug. 17, 1950
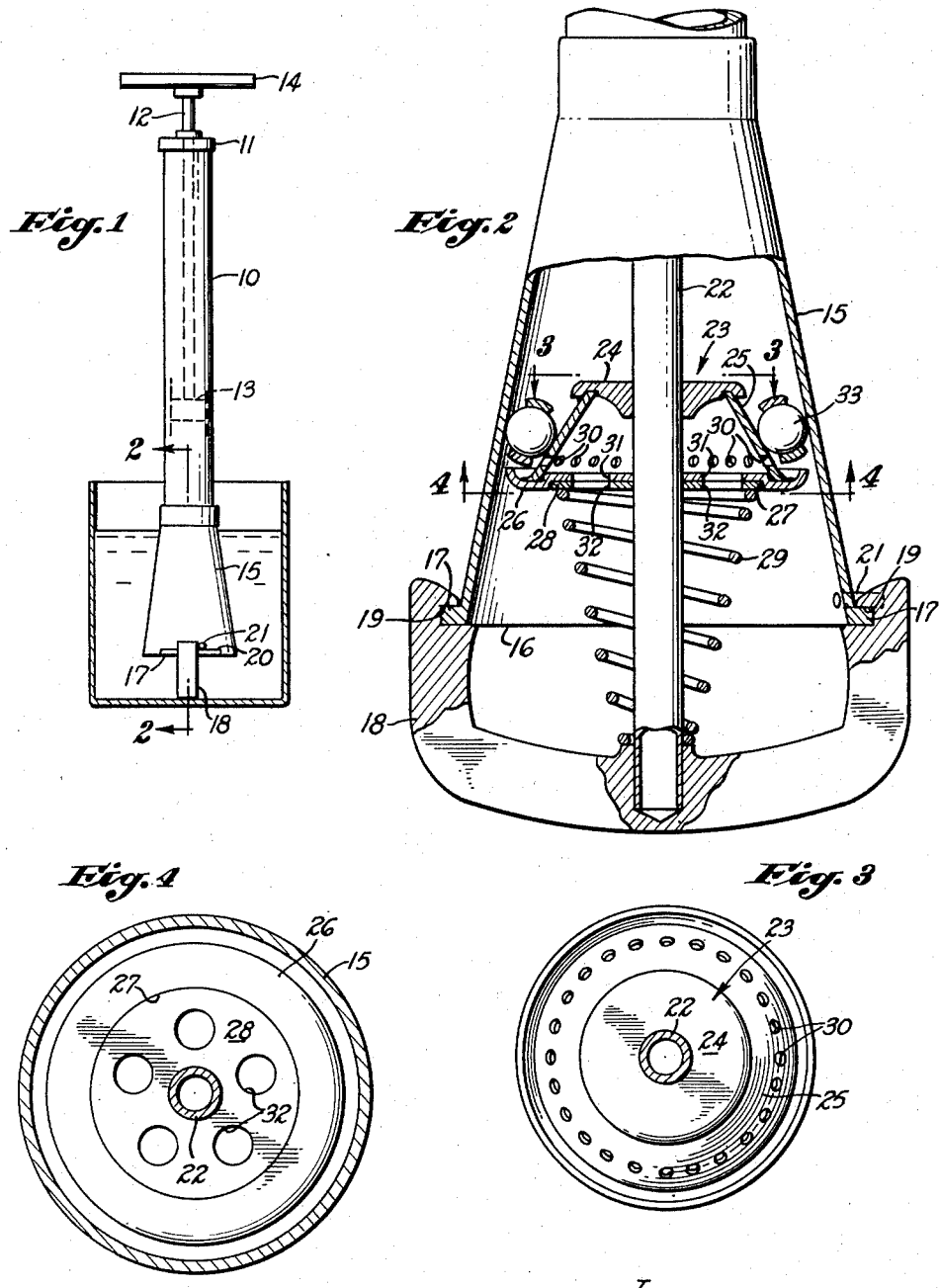
INVENTORS:
CHARLES E. FULLER
THOMAS J. SEDLAK
By C. Lauren Maloby
ATTORNEY

Patented Apr. 13, 1954

2,675,013

UNITED STATES PATENT OFFICE 2,675,013

BEARING WASHER

Charles E. Fuller and Thomas J. Sedlak,
Los Angeles, Calif.

Application August 17, 1950, Serial No. 179,932

6 Claims. (Cl. 134—169)

This invention relates to machinery cleaning equipment and more especially to a bearing washer, and is a continuation-in-part of our copending application, Serial No. 67,444, dated December 27, 1948, Patent Number 2,634,738, dated April 14, 1953.

An object of the invention is to provide a simple, practical and inexpensive bearing washer of the character described.

Another object of the invention is to provide a novel and efficient device for washing and cleaning bearings used in automobiles and other machines.

A further object of the invention is to provide a bearing washer having improved washing characteristics particularly adapted to roller bearings of the ball roller type.

Another object of the invention is to provide an improved device of the character described wherein bearings may be washed under a selective control whereby flow of the washing fluid past the bearing elements may be directed in different channels.

Other objects and advantages will appear and be brought out more fully in the following specification, reference being had to the accompanying drawing wherein:

Fig. 1 is a side view of an embodiment of our invention shown in operative relation to a container of cleaning solution.

Fig. 2 is a partial sectional view, enlarged, showing the major features of the invention.

Fig. 3 is an enlarged sectional view taken along the line 3—3 of Fig. 2.

Fig. 4 is a sectional view taken along the line 4—4 of Fig. 2.

Referring more particularly to the drawing we show a bearing washer comprising an elongated tube 10 having a plunger guide collar 11 at one end for guiding a plunger rod 12 to which is secured a plunger piston 13, the rod having a handle 14 at its outer end. Tube 10 has secured to its lower end a conical bearing seating member 15 formed with a rim 16 and a pair of tapered flanges 17 by which a yoke 18 is secured, the yoke having shoulder grooves 19 and one of the flanges 17 having high spots 20 adjacent a stop pin 21 for the yoke 18. A rod or tube 22 which is secured to yoke 18 extends into the seating member 15 along the axis of the cone formation thereof, and a button 23 is slidable on rod 22.

Button 23 comprises an apertured disc 24, a conical wall 25, and an end wall disc 26, discs 24 and 26 being secured to wall 25 in any suitable manner such as by welding or otherwise. End disc 26 is formed with a recess 27 for seating a valve disc 28, discs 26 and 28 having a central aperture through which rod 22 extends, and a spring 29 seating on yoke 18 retains valve disc 28 in recess 27 and urges the button 23 toward the smaller end of the cavity provided by seating member 15.

Wall 25 is formed with a plurality of apertures 30, and end disc 26 has a plurality of apertures 31, and valve disc 28 has a plurality of apertures 32, corresponding in size and position to apertures 31 of end wall 26. Figure 2 shows a ball roller bearing race 33 positioned in seating member 15 and held by the spring pressure of button 23.

The operation of the invention should be clear from the foregoing description. The bearing washer is placed in a washing solution as shown in Figure 1 and the pump action of the plunger and piston 12 and 13 draws the washing solution upwardly into tube 10 past the bearing race 33 and downwardly by return action. Valve disc 28, if positioned with apertures 31 and 32 in alignment, will permit washing solution to pass therethrough and through apertures 30 in wall 25 so that the cleaning fluid will be directed substantially radially past bearing race 33. Valve disc 28 may, however, be turned so that the disc closes apertures 31 in end wall 26, as a consequence of which the cleaning fluid will pass upwardly and downwardly past bearing race 33 and past the periphery of end disc 26. By this construction it will be clear that the washer of our invention provides a dual washing action, that is, both radially and longitudinally, and a more thorough and effective washing action of roller bearings, particularly ball bearings, may be accomplished.

While we have shown and described a preferred embodiment of our invention, it will be understood that this is illustrative rather than restrictive of our invention, and that changes and modifications may be made without departing from the spirit and scope of the sub-joined claims.

Having described our invention what we claim is:

1. In a bearing washer having a plunger tube and a conical bearing seat at one end thereof, means for holding a bearing race on said seat comprising in combination a yoke detachably secured to said seat, a rod extending from said yoke into and along the axis of the conical seat and a tapered bearing retaining button on said rod spring biased toward the smaller end of the conical seat, and having a fluid passage therethrough.

2. In a bearing washer having a plunger tube and a conical bearing seat at one end thereof, means for holding a bearing race on said seat comprising in combination a yoke detachably secured to said seat, a rod extending from said yoke into and along the axis of the conical seat and a tapered bearing retaining button on said rod spring biased toward the smaller end of the conical seat, and having a plurality of fluid passages therethrough.

3. In a bearing washer having a plunger tube and a conical bearing seat at one end thereof, means for holding a bearing race on said seat comprising in combination a yoke detachably secured to said seat, a rod extending from said yoke into and along the axis of the conical seat and a tapered bearing retaining button on said rod spring biased toward the smaller end of the conical seat, and having a plurality of radially directed fluid passages therethrough.

4. In a bearing washer having a plunger tube and a conical bearing seat at one end thereof, means for holding a bearing race on said seat comprising in combination a yoke detachably secured to said seat, a rod extending from said yoke into and along the axis of the conical seat and a tapered bearing retaining button on said rod spring biased toward the smaller end of the conical seat, and having a plurality of radially directed fluid passages therethrough, and valve means to control fluid passing through said passages.

5. In a bearing washer having a plunger tube and a conical bearing seat at one end thereof, means for holding a bearing race on said seat comprising in combination a yoke detachably secured to said seat, a rod extending from said yoke into and along the axis of the conical seat and a tapered bearing retaining button on said rod spring biased toward the smaller end of the conical seat, and having a plurality of radially directed fluid passages therethrough, and valve means to control fluid passing through said passages, said last means including an apertured plate and a disc valve on said button.

6. In a bearing washer having a plunger tube and a conical bearing seat at one end thereof, a spring seated bearing retaining button for holding a bearing on said seat, said button being hollow and having a conical side wall and a circular end wall, said walls each having a plurality of apertures to permit a fluid flow therethrough and a valve for said end wall apertures.

References Cited in the file of this patent

UNITED STATES PATENTS

| Number | Name | Date |
|---|---|---|
| 1,749,312 | Blair | Mar. 4, 1930 |
| 2,137,660 | Welke | Nov. 22, 1938 |
| 2,168,746 | Saal | Aug. 8, 1939 |